United States Patent [19]
Goto

[11] Patent Number: 5,600,225
[45] Date of Patent: Feb. 4, 1997

[54] NONCONTACTING CHARGING DEVICE

[76] Inventor: Masataka Goto, c/o NEC Corporation, 7-1, Shiba 5-chome, Minato-ku, Tokyo, Japan

[21] Appl. No.: 492,628

[22] Filed: Jun. 20, 1995

[30] Foreign Application Priority Data

Jun. 30, 1994 [JP] Japan .................................. 6-171722

[51] Int. Cl.$^6$ .............................. H01M 10/44; H02J 7/00
[52] U.S. Cl. ................................................. 320/2; 320/21
[58] Field of Search ........................... 320/2, 21; 329/443

[56] References Cited

U.S. PATENT DOCUMENTS 4,873,677  10/1989  Sakamoto et al. .......................... 320/2
4,942,352   7/1990  Sano ........................................... 320/2

FOREIGN PATENT DOCUMENTS 2-280631  11/1990  Japan .
4-217824   8/1992  Japan .
 1180168   2/1970  United Kingdom .

Primary Examiner—Peter S. Wong
Assistant Examiner—Patrick B. Law
Attorney, Agent, or Firm—Scully, Scott, Murphy & Presser

[57] ABSTRACT

A non-contacting charging device is disclosed which performs charging in which electric power of a charger 1 is supplied without direct contact to a storage battery 210, and which includes in the charger 1 a primary coil 103 and circuits 104, 105 for supplying AC power to the primary coil, and also includes in the radio communication device having a storage battery 210, a secondary coil 212 that couples electromagnetically with the primary coil 103 and a circuit 211 for supplying the induced current power generated in the secondary coil to the storage battery as charging power. This device is provided with halt signal generating circuits 203, 209, and 214 for generating a halt signal that commands a halt of supply of AC power to the primary coil, and a halting circuit for halting supply of AC power to the primary coil in response to a halt signal, the halt signal generating circuit being provided in the radio communication device. If it is necessary to make or receive a call during charging of the radio communication device, a halt signal is generated on the radio communication device side to halt charging, thereby eliminating the attractive force caused by the electromagnetic induction in effect between the radio communication device and the charger, and allowing removal of the radio communication device from the charger with a minimum of effort.

7 Claims, 2 Drawing Sheets

NONCONTACTING CHARGING DEVICE

BACKGROUND OF THE INVENTION

1. Field of the Invention

The present invention relates to a charging device for a radio communication device, and particularly to a charging device for charging, in an electrically noncontacting state, a radio communication device such as a storage-battery-equipped radiotelephone.

2. Description of the Related Art

Charging devices have been suggested recent years for charging chargeable storage batteries installed in radio communication devices such as radiotelephones that are capable of charging without being electrically connected to the radiotelephone. One example of such a device is a noncontacting charging device disclosed in Japanese Patent Laid-open 280631/90. In this charging device, a battery charger is provided with a primary coil to which an alternating current signal is supplied, while a radiotelephone is provided with a secondary coil which couples electromagnetically with the primary coil and which is connected to a charging circuit for a storage battery. By bringing the radiotelephone into proximity with the charger and supplying the primary coil with alternating current of prescribed voltage and frequency, an induced electromotive force is generated in the secondary coil to serve to charge the storage battery of the radiotelephone.

In this charging device of the prior art, as the mutual induction coefficient between the primary and secondary coils is increased to raise an efficiency of an electric power supply to the storage battery of the radiotelephone, the electromagnetic attraction working between the two coils increase nearly in proportion to the mutual induction coefficient. This attractive force, however, adversely makes it difficult to lift lightly the radiotelephone from charger when it is necessary to make a call or to receive an incoming call during charging.

In such a case, charging is stopped in a charger of the prior art by pulling the power cord of an external power source connected to the charger from the commercial power socket. This necessity to pull the cord when lifting the radiotelephone from the charger is a nuisance, particularly when the radio telephone must be picked up quickly to receive an incoming call while using the charging device. However, if the power of the charger is decreased in order to weaken the electromagnetic attraction between the coils to circumvent this problem, there is the problem that power supplied to the storage battery of the radiotelephone also decreases, causing charging efficiency to drop, and making rapid charging impossible.

SUMMARY OF THE INVENTION

The object of the present invention is to provide a noncontacting charging device which has high charging efficiency and which moreover allows easy removal of the radio communication device from the charger, should it be needed for use such as to make or receive a call during charging.

In addition, another object of the present invention is to provide a noncontacting charging device that allows easy connection or disconnection between the radiotelephone and charger.

To achieve the above-described objects, the noncontacting charging device of the present invention is a charging device for supplying, in a noncontacting state, electrical power to a storage battery of a battery-equipped radio communication device, comprising a charger having a primary coil and alternating current supply means for supplying alternating current power to the primary coil; a secondary coil that couples electromagnetically with the primary coil, and charging-power supply means for supplying, as charging power, electrical power of the induced current produced in the secondary coil to the storage battery; halt signal generating means for generating a halt signal that commands a halt of the supply of alternating current power to the primary coil; and halting means for halting the supply of alternating current power to the primary coil in response to a halt signal; the secondary coil, charge power supply means, and halt signal generating means being provided in the radio communication device.

By means of this device, a halt signal is issued from the radio communication device. By means of this signal, charging may be halted through the operation effected on the side of the radio communication device when it is necessary to make or receive a call while charging the radio communication device, thereby eliminating the effect of electromagnetic attraction upon the radio communication device and enabling easy removal of the radio communication device from the charger. Consequently, the process of removing a radio communication device from a charger is made easy.

According to a preferable form of the halting means the radio communication device is provided with a first photoelectric converting means that converts the halt signal to a light signal and outputs it to the charger; and the charger is provided with photoelectric a second converting means that receives the light signal and converts it to an electrical signal, and cut-off circuit means for cutting the path of power supply to the primary coil in response to the output of the a second photoelectric converting means.

Through this simple construction, the halt signal can be transmitted from the radio communication device side to the charger side without direct contact by means of a light signal.

The halt signal generating means can be made up of at least one console key for commanding a halt of the supply of alternating current power to the primary coil, and a first halt signal generating circuit for producing a halt signal in response to a signal generated by key input to this console key.

Further, the halt signal generating means may also include a second halt signal generating circuit for detecting an incoming call to the radio communication device and outputting a halt signal.

By means of this halt signal generating means, when a call must be originated or received during charging of the radio communication device, charging can be halted either through the operator's manipulation of the console key of the radio communication device or automatically when an incoming call is detected, and in this way the radio communication device may be lightly removed from the charger, thereby allowing easy use of the radio communication device.

As halting means, a switch for cutting the power supply path to the primary coil by manual operation may be provided in the charger. Charging may halted by manual operation of this switch.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

The invention will next be explained with reference to the accompanying figures.

Figure 1:
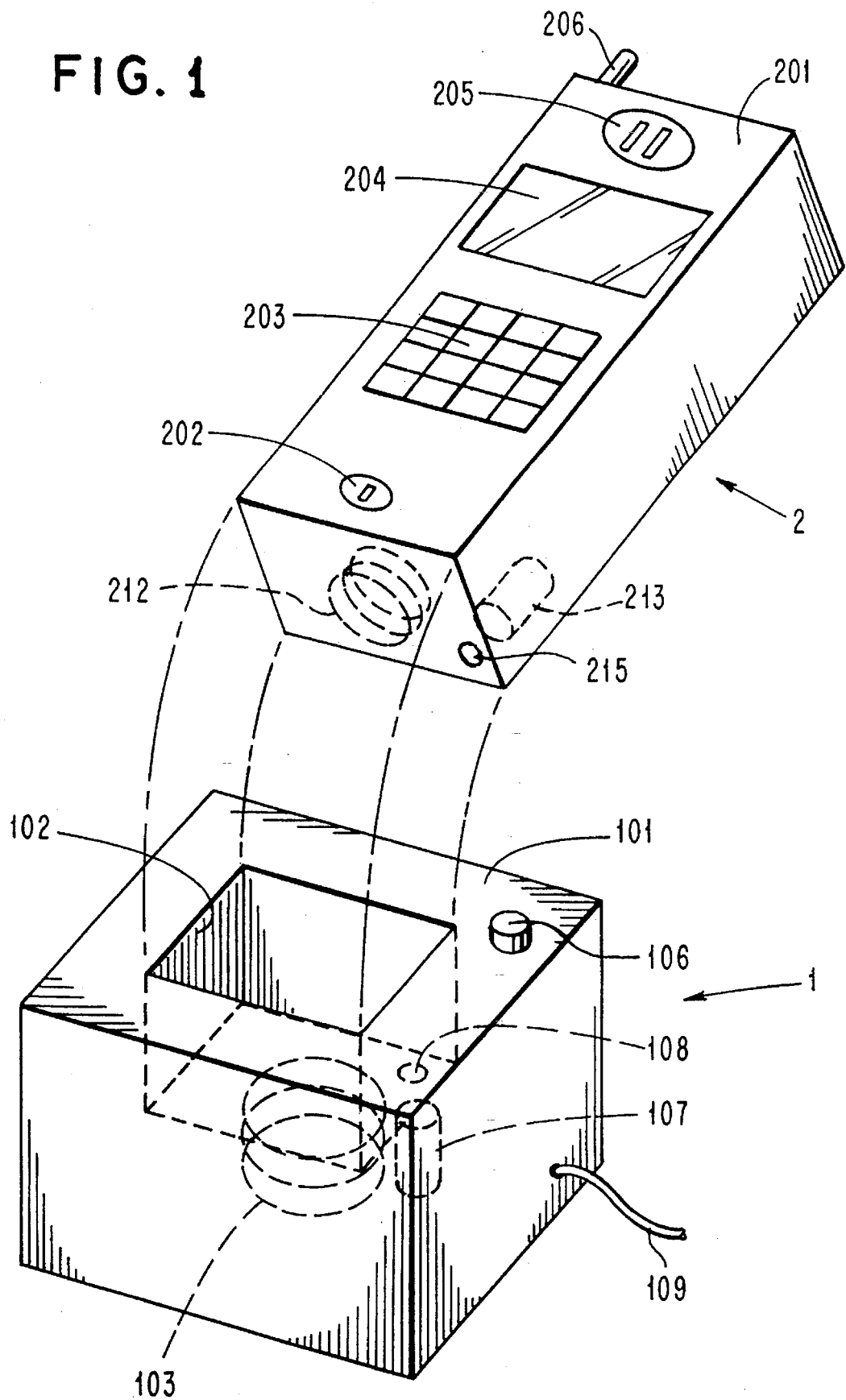
FIG. 1 is an exterior view showing the construction of one embodiment of a charging device of the present invention.
Figure 2:
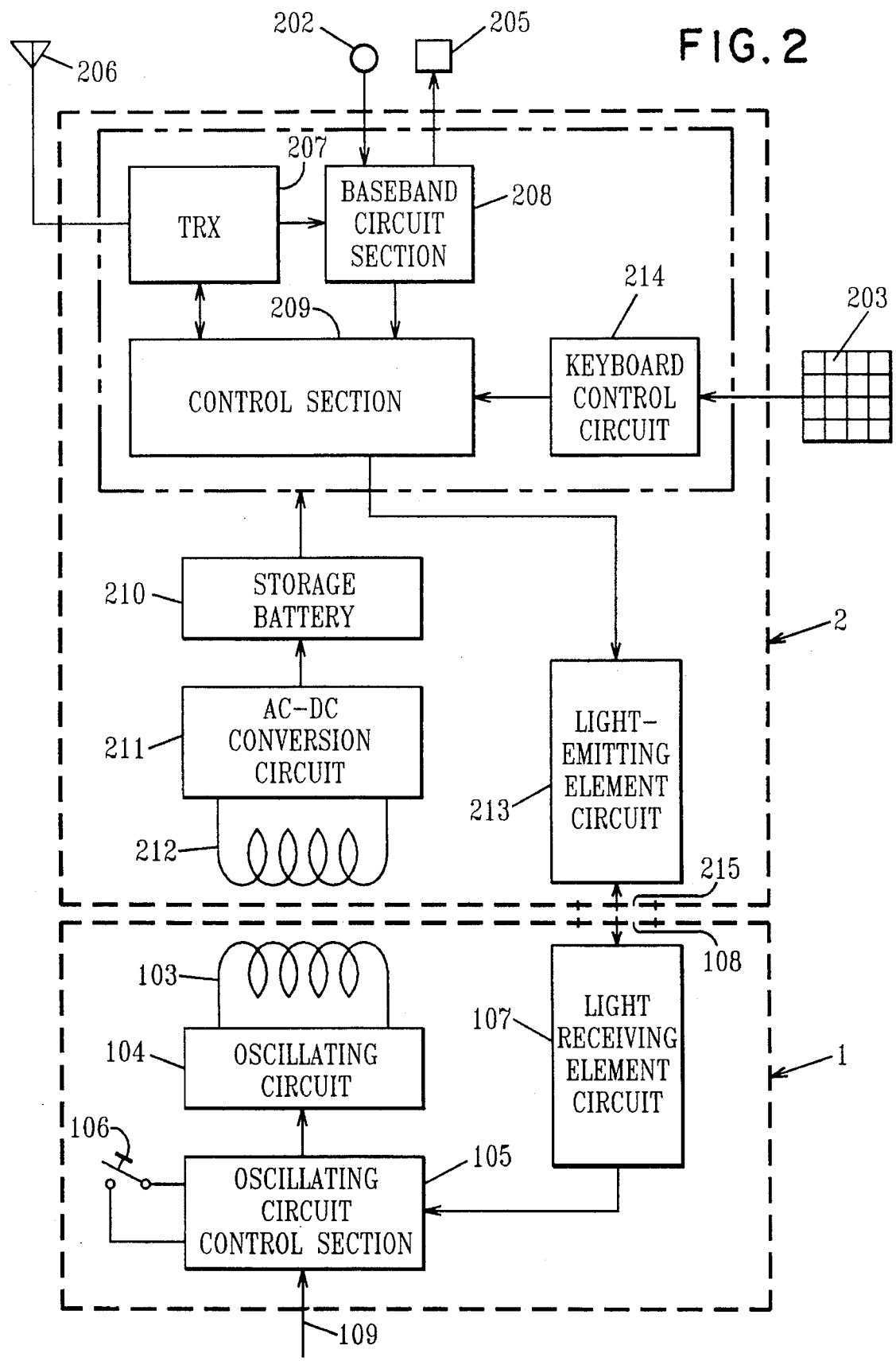
FIG. 2 is a block diagram showing the internal construction of the charging device shown in FIG. 1.

FIG. 1 is an exterior perspective view showing one embodiment in which the noncontacting charging device of the present invention is applied to a radiotelephone. FIG. 2 is a block diagram illustrating the circuit construction of the device shown in FIG. 1. The charger 1 for supplying power for charging to the radiotelephone is installed within a base case 101. A depression 102 into which the radiotelephone may be inserted is provided on the upper surface of the base case 101, and a primary coil 103 is provided in the base case 101 for producing magnetic flux which runs around the side walls of the depression 102 in a vertical plane. This primary coil 103 is connected to an oscillating circuit 104 for supplying alternating current to the coil. In addition, an oscillating circuit control section 105 is provided for supplying electrical power to this oscillating circuit 104. A manually operated switch 106 for turning on and off the power supplied to the oscillating circuit 104 is connected to the oscillating circuit control section 105. This switch 106 is provided in a portion of the upper surface of the base case 101.

Furthermore, the charger 1 is provided with a light-receiving element circuit 107. The light-receiving element circuit 107 is arranged facing a transparent window 108 provided in a portion of the depression 102, and in response to a light signal transmitted through the transparent window 108, outputs a signal for on/off controlling a power switch circuit (not shown) incorporated in the oscillating circuit control section 105. In the present embodiment, a photo-diode is used as the light-receiving element circuit, and a power cord 109 for supplying power from an external power source not shown to the oscillating circuit control section 105 is led out from the base case 101.

The radiotelephone 2 is provided with a microphone 202, a console keyboard 203, a display 204, a receiver 205, and an antenna 206 mounted on a slender telephone case 201. Inside the telephone case 201 are provided a known telephone speech network made up of a transmitter-receiver (TRX) 207, a baseband circuit section 208, a control section 209, and a keyboard control circuit 214, and as a power source, a storage battery 210. This storage battery 210 is connected to a secondary coil 212 by way of an AC-DC conversion circuit 211. In addition, a light-emitting element circuit 213 is connected to the control section 209. In the present embodiment, this light-emitting element circuit 213 is made up of a light-emitting diode. The console keyboard 203 and control section 209 are connected by way of keyboard control section 214.

The base of the telephone case 201 is constructed to allow insertion into the depression 102 provided in the base case 101, and in this way the radiotelephone 2 may be placed on the charger 1 in an erect state. The secondary coil 212 is provided within the base portion of the case 201 of the radiotelephone 2, and a transparent window 215 is provided in the bottom surface and the light-emitting element circuit 213 is provided facing the window 215. Transparent windows 215 and 108 are arranged in face-to-face positions.

To operate, the radiotelephone 2 is placed upon the charger 1 when the storage battery 210 built into the radiotelephone 2 is to be charged. At this time, the radiotelephone 2 is held in an erect state by means of insertion of the base portion of the telephone case 201 of the radiotelephone 2 into the depression 102 provided in the base case 101 of the charger 1. The charger 1 is then connected by way of power cord 109 to an external power source not shown, and switch 106 is turned on. This causes, in the charger 1, the power controlled by oscillating circuit control section 105 to be supplied to the oscillating circuit 104. An alternating current signal of prescribed frequency generated in this oscillating circuit 104 is supplied to the primary coil 103. As a result, an alternating magnetic field is generated by the primary coil 103 within the depression 102 in the base case 101 of the charger 1.

This alternating magnetic field generates an induced electromotive force in the secondary coil 212 arranged in the base portion of the telephone case 201 of the radiotelephone 2. The alternating current arising from this induced electromotive force is converted to direct current in an AC-DC conversion circuit 211. The direct current power outputted from the AC-DC conversion circuit 211 is supplied to the storage battery 210 and causes the battery to be charged. In this way, the storage battery 210 built into the radiotelephone 2 can be charged without being electrically connected to the charger 1, i.e., while in an electrically noncontacting state.

When charging is completed, or when it is necessary to take up the radiotelephone 2 from the charger for a call during charging, electromagnetic attraction caused by the electromagnetic induction between the primary coil 103 and the secondary coil 212 will be in effect if nothing is dealt with the charger, and will cause considerable force to be required to overcome this electromagnetic attraction in order to lift the radiotelephone 2 from the charger 1. In this case, switch 106 is operated, and by means of oscillating circuit control section 105, the supply of power to oscillating circuit 104 is halted, and the oscillation in oscillating circuit 104 stops. By holding back the generation of magnetic flux in the primary coil 103, the electromagnetic attraction between the two coils can be checked and the radiotelephone 2 can be lifted with a normal amount of force.

A first halt-signal generating circuit is provided in the control section 209 for supplying a halt signal in response to a signal generated by pushing specified keys of the console keyboard 203 on the radiotelephone 2 that is to be lifted. The halt signal delivered from the control section 209 is converted to a light signal by the light-emitting element circuit 213 and supplied from window 215 in the base portion of the telephone case 201. This light signal passes through window 108 provided in the base case 101 of the charger 1, is received by the light-receiving element circuit 107 and converted to an electrical signal. This electrical signal is transmitted to the oscillating circuit control section 105 and causes the oscillation of the oscillating circuit 104 to stop. Accordingly, if the user sets the key at the most accessible position when holding the radiotelephone as the specified key mentioned above, this key can be easily operated to halt oscillation in the oscillating circuit 104 when picking up the radiotelephone with one hand and enable easy lifting of the radiotelephone 2.

It is also possible to provide a second halt signal generating circuit in the control section 209 of the radiotelephone 2 for detecting an incoming call and producing a halt signal. In such a case, a halt signal is produced automatically upon arrival of an incoming call. As in the case of the previously described halt signal, this halt signal is converted to a light signal in the light-emitting element circuit 213. The charger 1 receives the light signal at the light-receiving element circuit 107 which converts the light signal into an electrical signal. This electrical signal causes the oscillating circuit control section 105 to halt oscillation in the oscillating circuit 104. Accordingly, charging can be halted automatically when there is an incoming call to the radiotelephone 2 even during charging, and a user is enabled to easily lift the radiotelephone 2.

Although not shown in the figures, the previously described switch 106 may be constructed as a contact switch arranged on the inner bottom or inner side surface of the depression 102 such that the switch is turned on when the radiotelephone is placed within the charger. In this case, a construction is possible by which a slight tilting of the radiotelephone 2 within the depression 102 causes the contact switch to turn off, thereby halting oscillation of the oscillating circuit 104 and halting charging so that the radiotelephone can be lifted with a minimum of effort.

While the embodiment described hereinabove presents one example in which the present invention is applied to a chargeable radiotelephone, the ideal application of the present invention is in applications of the apparatus of the present invention to any radio communication device which has a built-in chargeable battery and which may be needed for immediate use even during charging, for example, radio paging devices or radio communication devices such as transceivers.

The present invention may be summarized as follows:

By providing halting means for halting the supply of power to a primary coil provided in a charger of a noncontacting charging device, and by activating this halting means when the radio communication device is to be removed from the charger for use, electromagnetic attraction between the primary coil in the charger and the secondary coil within the radio communication device arising during charging of the radio communication device can be eliminated, thereby allowing lifting of the radio communication device with minimal effort and easing the handling of the radio communication device.

By automatically generating a halt signal when the console keyboard of the radio communication device is manipulated or when there is an incoming call to the radio communication device, it is possible to halt charging automatically or through an easy operation when a call must be made or received during charging of the radio communication device, thereby further facilitating handling of the radio communication device upon call sending or call receiving.

By converting the halt signal to a light signal and supplying it to the charger, it is possible to transmit the halt signal from the radio communication device to the charger without direct contact.

The halting means for halting power supply to the primary coil may be constructed as a manually operated switch provided in the charger that cuts the power supply path to the primary coil, and merely operating this switch allows the radio communication device to be lifted with a minimum of effort.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A noncontacting charging device for supplying, in a noncontacting state, electrical power to a storage battery of a battery-equipped radio communication device, comprising:

a charger having a primary coil and alternating current supply means for supplying alternating current power to said primary coil;

a secondary coil that couples electromagnetically with said primary coil, and charging-power supply means for supplying, as charging power, electrical power of an induced current produced in said secondary coil to said storage battery;

halt signal generating means for generating a halt signal in response to one of an incoming call and a manual input that commands a halt of the supply of alternating current power to said primary coil; and halting means for halting the supply of alternating current power to said primary coil in response to said halt signal;

said secondary coil, said charging power supply means, and said halt signal generating means being provided in said radio communication device.

2. A noncontacting charging device according to claim 1 wherein said halting means comprises:

a first photoelectric converting means provided in said radio communication device for converting said halt signal to a light signal and supplying said light signal to said charger; and a second photoelectric converting means for receiving said light signal and converting said light signal to an electrical signal, and cut-off circuit means for cutting the path of power supply to said primary coil in response to output of said second photoelectric converting means, said second photoelectric converting means and said cut-off circuit means being provided in said charger.

3. A noncontacting charging device according to claim 1 wherein said halting means comprises a manually operated switch provided in the charger for cutting the power supply path to the primary coil.

4. A noncontacting charging device for supplying, in a noncontacting state, electrical power to a storage battery of a battery-equipped radio communication device, comprising:

a charger having a primary coil and alternating current supply means for supplying alternating current power to said primary coil;

a secondary coil that couples electromagnetically with said primary coil, and charging-power supply means for supplying, as charging power, electrical power of an induced current produced in said secondary coil to said storage battery;

halt signal generating means for generating a halt signal that commands a halt of the supply of alternating current power to said primary coil; and halting means for halting the supply of alternating current power to said primary coil in response to said halt signal; wherein said halt signal generating means comprises at least one console key for commanding the halt of the supply of alternating current power to said primary coil, and a first halt signal generating circuit for producing said halt signal in response to a signal generated by a key input to said console key;

said secondary coil, said charging power supply means, and said halt signal generating means being provided in said radio communication device.

5. A noncontacting charging device according to claim 4 wherein said halting means comprises:

a first photoelectric converting means provided in said radio communication device for converting said halt signal to a light signal and supplying said light signal to said charger; and a second photoelectric converting means for receiving said light signal and converting said light signal to an electrical signal, and cut-off circuit means for cutting the path of power supply to said primary coil in response to output of said second photoelectric converting means, said second photoelectric converting means and said cut-off circuit means being provided in said charger.

6. A noncontacting charging device for supplying, in a noncontacting state, electrical power to a storage battery of a battery-equipped radio communication device, comprising:

a charger having a primary coil and alternating current supply means for supplying alternating current power to said primary coil;

a secondary coil that couples electromagnetically with said primary coil, and charging-power supply means for supplying, as charging power, electrical power of an induced current produced in said secondary coil to said storage battery;

halt signal generating means for generating a halt signal that commands a halt of the supply of alternating current power to said primary coil; and halting means for halting the supply of alternating current power to said primary coil in response to said halt signal; wherein said halt signal generating means comprises a second halt signal generating circuit for detecting an incoming call to the radio communication device and producing said halt signal;

said secondary coil, said charging power supply means, and said halt signal generating means being provided in said radio communication device.

7. A noncontacting charging device according to claim 6 wherein said halting means comprises:

a first photoelectric converting means provided in said radio communication device for converting said halt signal to a light signal and supplying said light signal to said charger; and a second photoelectric converting means for receiving said light signal and converting said light signal to an electrical signal, and cut-off circuit means for cutting the path of power supply to said primary coil in response to output of said second photoelectric converting means, said second photoelectric converting means and said cut-off circuit means being provided in said charger.

* * * * *

UNITED STATES PATENT AND TRADEMARK OFFICE
CERTIFICATE OF CORRECTION

PATENT NO. : 5,600,225
DATED     : February 4, 1997
INVENTOR(S) : Masataka Goto

It is certified that error appears in the above-indentified patent and that said Letters Patent is hereby corrected as shown below:

Column 2, line 34: "photoelectric a second"

should read --a second photoelectric--

Signed and Sealed this

Fourth Day of August, 1998

Attest:

BRUCE LEHMAN

*Attesting Officer*      Commissioner of Patents and Trademarks

UNITED STATES PATENT AND TRADEMARK OFFICE
CERTIFICATE OF CORRECTION

PATENT NO. : 5,600,225
DATED : February 4, 1997
INVENTOR(S) : Masataka Goto

It is certified that error appears in the above-indentified patent and that said Letters Patent is hereby corrected as shown below:

On the Title Page, after Section [76], insert the following: -- [73] Assignee: NEC Corporation Tokyo, Japan--

Signed and Sealed this

Third Day of November, 1998

Attest:

Attesting Officer

BRUCE LEHMAN

*Commissioner of Patents and Trademarks*